Dec. 28, 1937.  W. S. DIETRICH  2,103,713
CAR TRUCK
Filed March 22, 1935  7 Sheets-Sheet 2

INVENTOR
William S. Dietrich,
By Archworth Martin,
Attorney.

Dec. 28, 1937. W. S. DIETRICH 2,103,713
CAR TRUCK
Filed March 22, 1935 7 Sheets-Sheet 3

INVENTOR
William S. Dietrich,
By Archworth Martin,
Attorney.

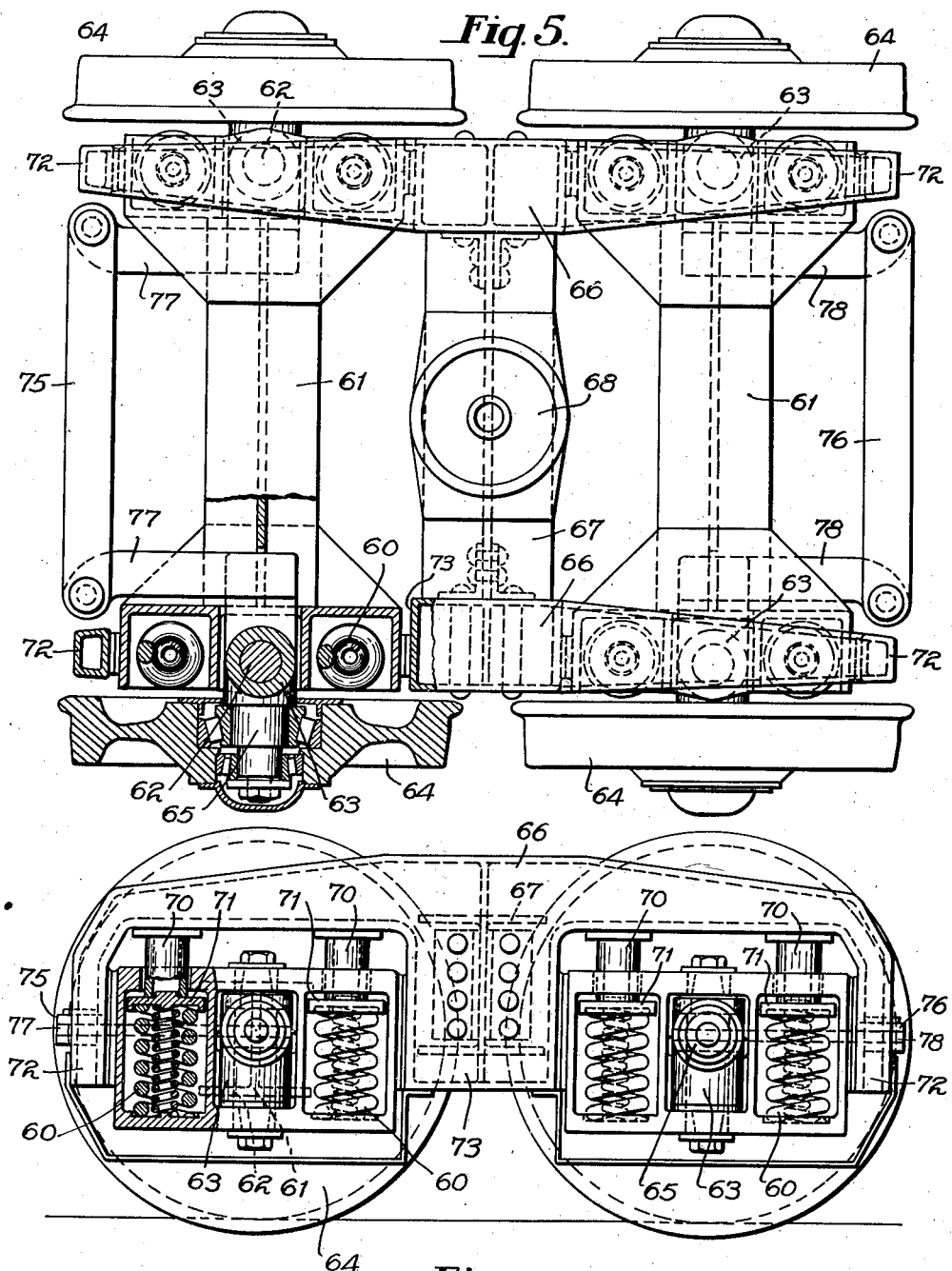

Dec. 28, 1937.  W. S. DIETRICH  2,103,713
CAR TRUCK
Filed March 22, 1935  7 Sheets-Sheet 5

INVENTOR
William S. Dietrich,
By Archworth Martin,
Attorney.

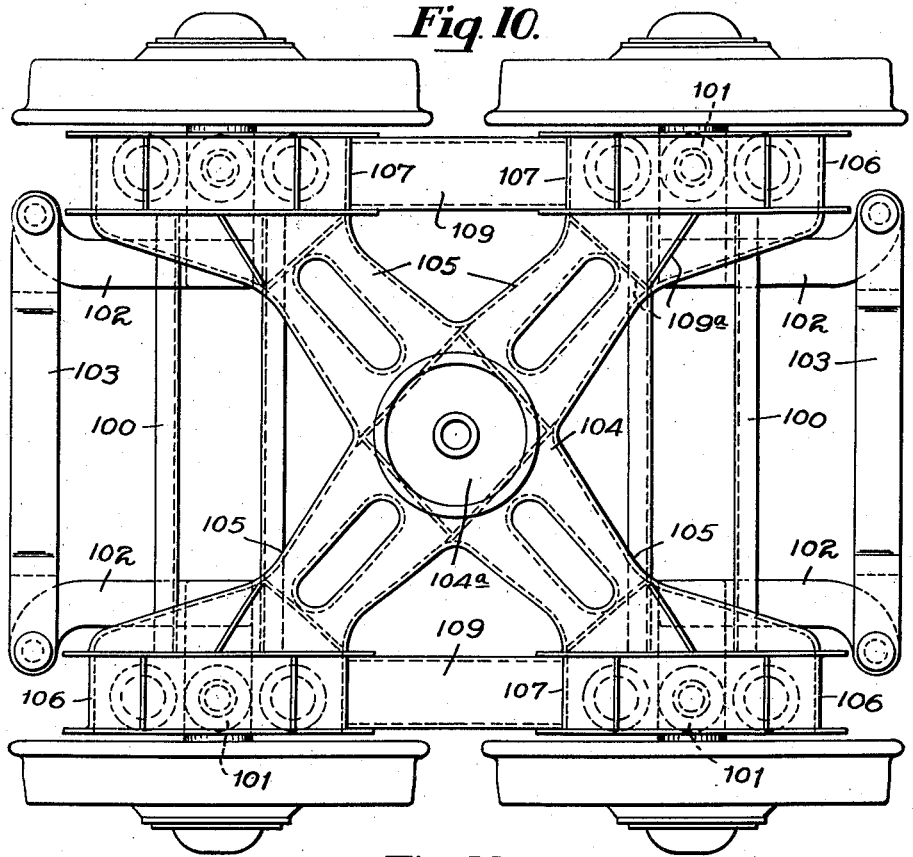
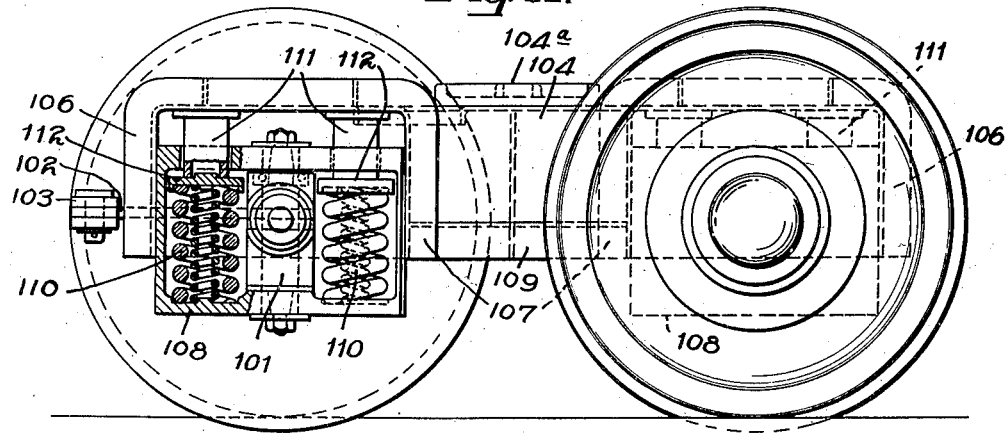

Dec. 28, 1937.  W. S. DIETRICH  2,103,713
CAR TRUCK
Filed March 22, 1935  7 Sheets-Sheet 7
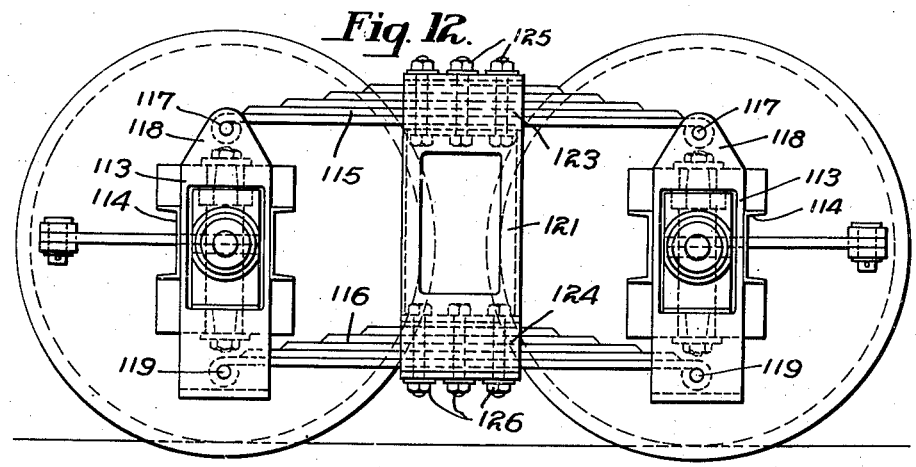
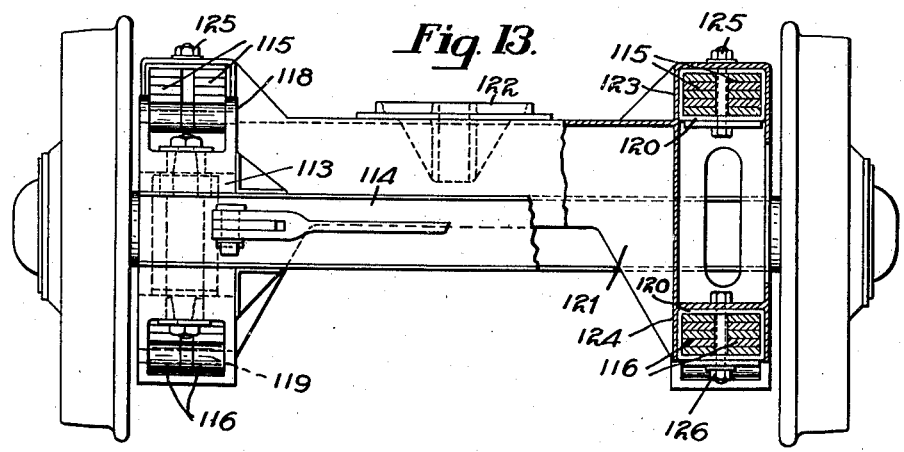
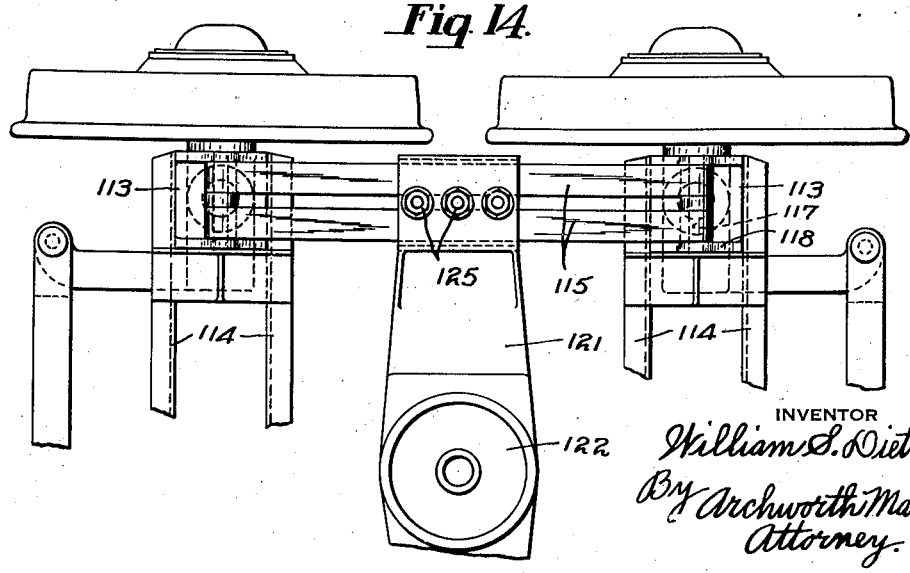
INVENTOR
William S. Dietrich,
By Archworth Martin,
Attorney.

Patented Dec. 28, 1937

2,103,713

UNITED STATES PATENT OFFICE 2,103,713

CAR TRUCK

William S. Dietrich, Greenville, Pa.

Application March 22, 1935, Serial No. 12,418

4 Claims. (Cl. 105—169)

My invention relates to railway car trucks, and has for one of its objects the provision of means for so mounting the truck wheels that they will each have pivotal movement about a vertical axis relative to the truck frame.

Another object of my invention is to provide means whereby the said pivotal movement will be automatically imparted to said wheels when entering curves, so that the truck and its wheels at each side of the truck will tend to follow an arcuate path of travel corresponding approximately to the arcuate contour or curve of the track rail, whereby slippage of the wheels on the rails is substantially eliminated, and the friction of the wheel flanges against the sides of the rails is materially reduced.

Still another object of my invention is to provide an improved spring arrangement of supporting springs for car trucks.

A further object of my invention is to provide a truck frame of generally simplified and improved form, and of greater rigidity than various types of frames heretofore employed.

The arrangement hereinafter described has the further advantage of enabling the cars to pass around curves of shorter radius than in the case of cars of the standard type.

In cars of later types wherein special efforts are made to reduce weight, the trucks have been shortened greatly. Such shortening of the trucks, while reducing the weight and enabling the cars to pass around curves of shorter radius with greater safety than in the case of longer trucks, have a tendency to shimmy or oscillate about their center pins in such manner that there is not only danger of derailing, but excessive vibration to the car body.

Figure 1:
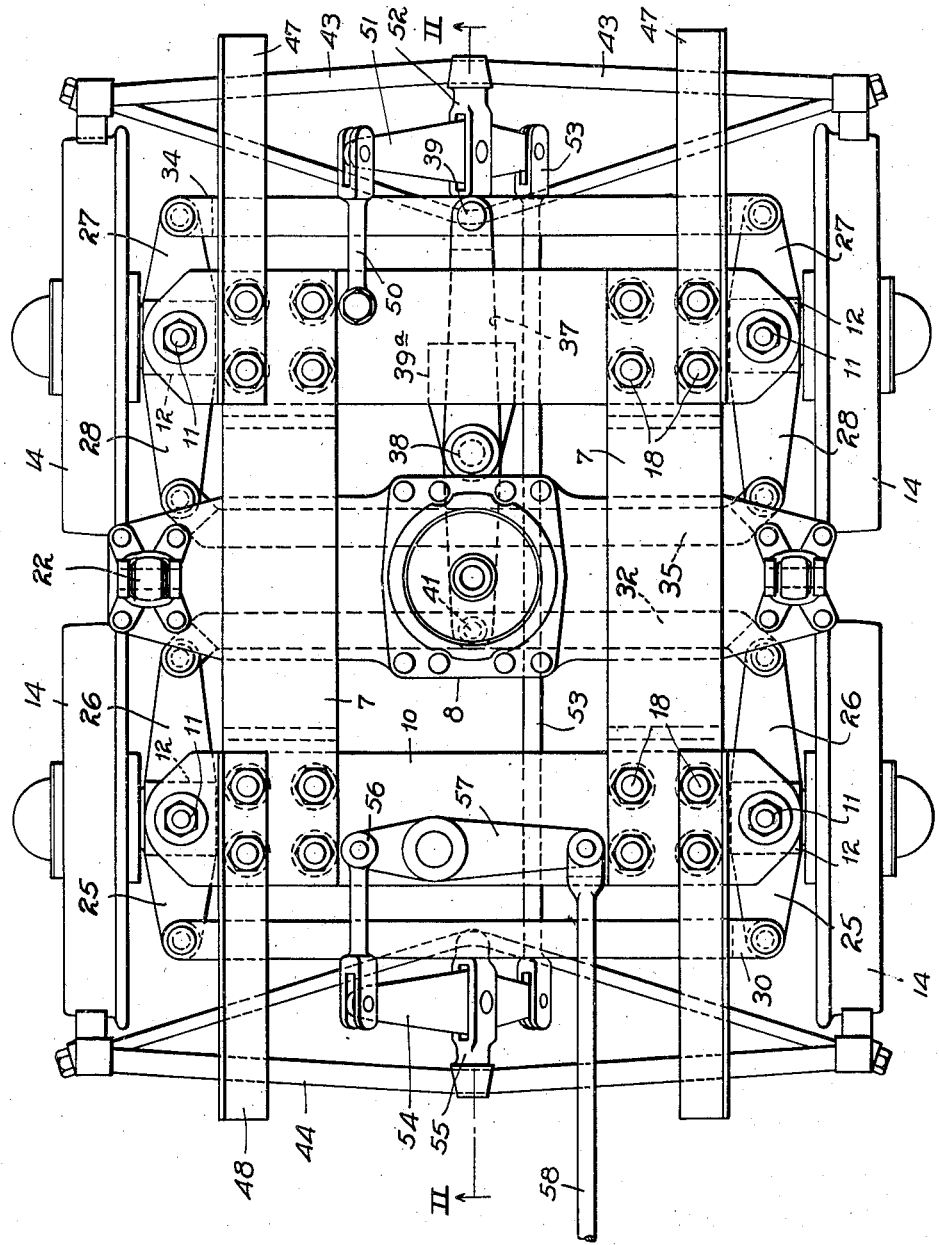
Figure 2:
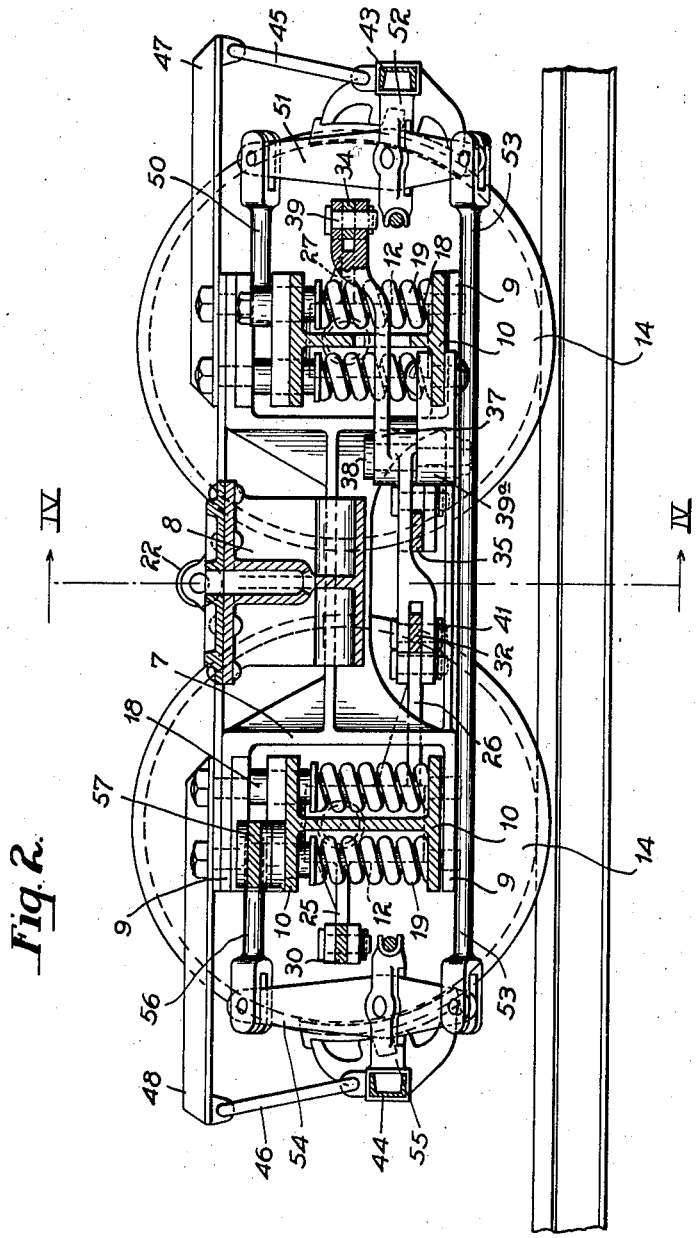
Figure 3:
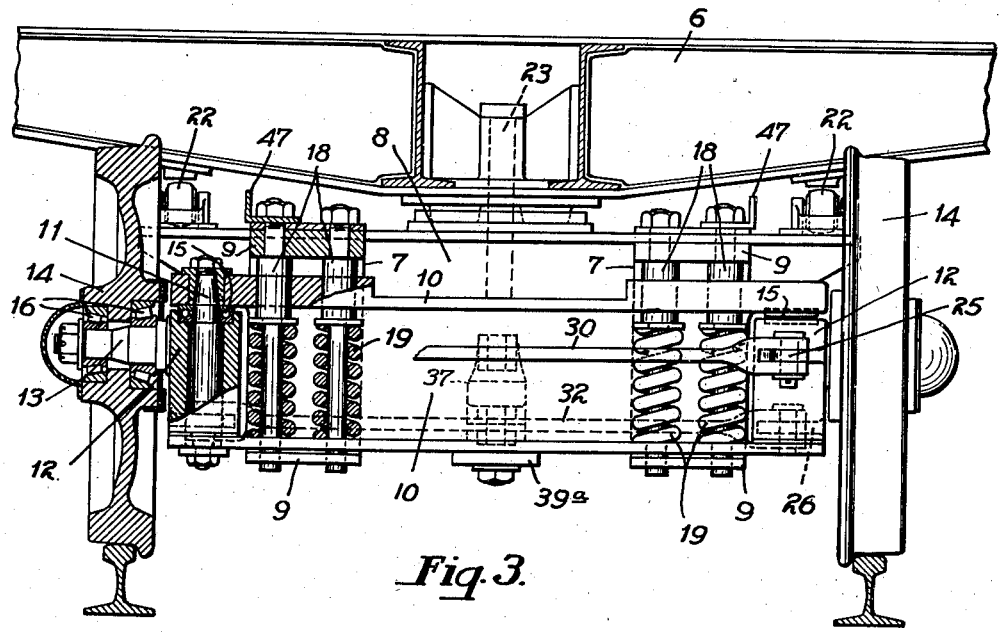
Figure 4:
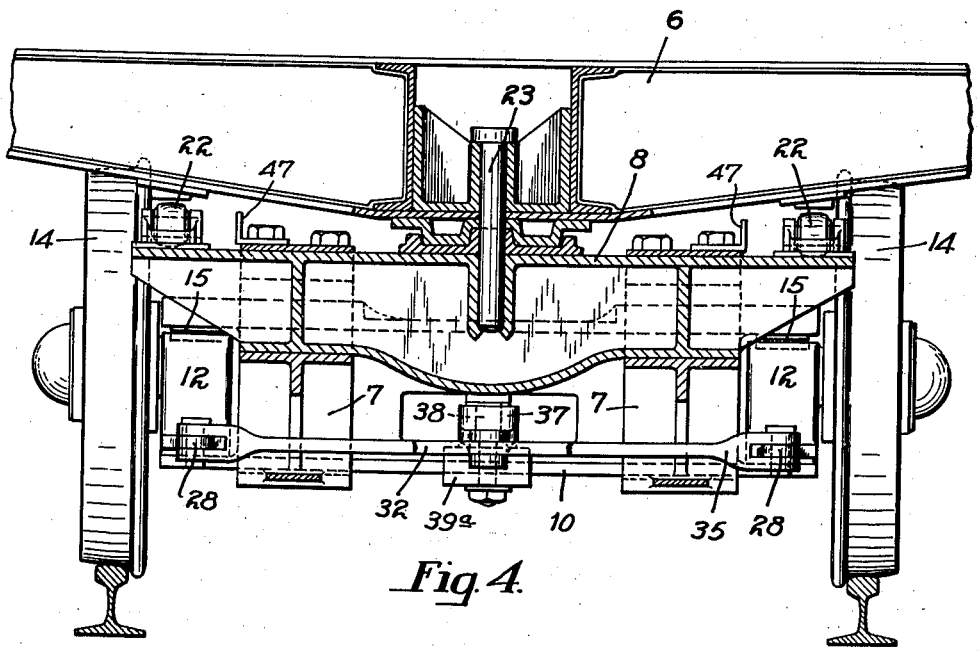
Figure 7:
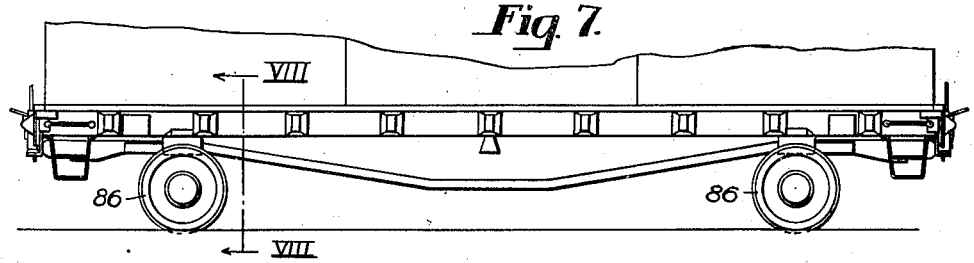
Figure 8:
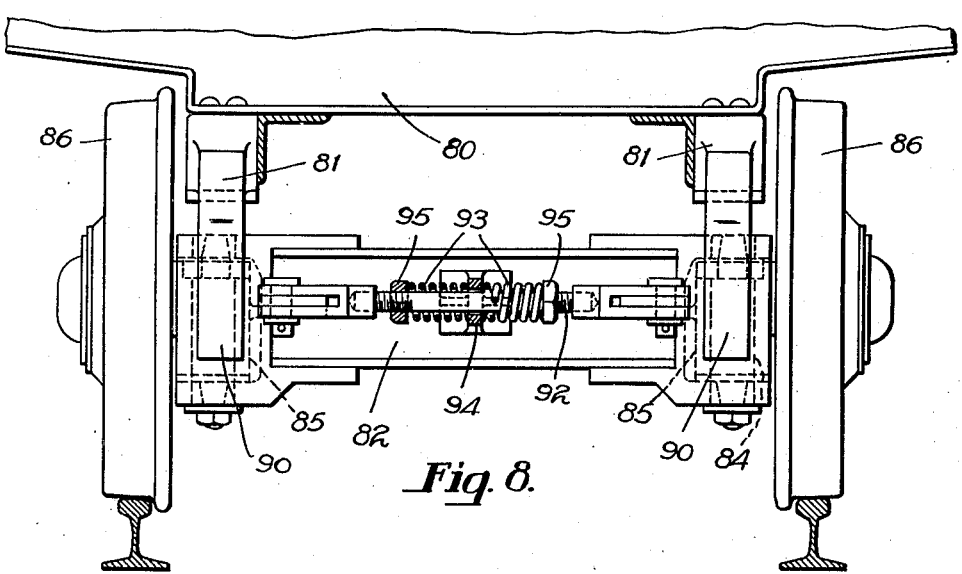
Figure 9:
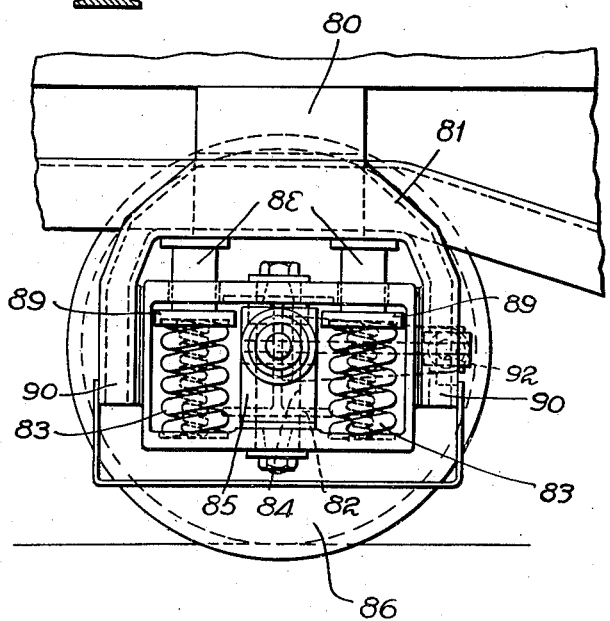

In the accompanying drawings, Figure 1 is a plan view of a car truck; Fig. 2 is a view taken on the line II—II of Fig. 1; Fig. 3 is an end view of the truck partially in section; Fig. 4 is a view taken on the line IV—IV of Fig. 2; Fig. 5 is a sectional plan view showing a modification of the structure of Fig. 1; Fig. 6 is a side view thereof, partly in section; Fig. 7 is a view of somewhat schematic form, showing the use of the invention in connection with cars which have only four wheels; Fig. 8 is an enlarged view, taken on the line VIII—VIII of Fig. 7; Fig. 9 is a side view of a portion of the structure of Fig. 8, partly in section; Fig. 10 is a plan view showing a modified form of truck frame; Fig. 11 is a view partially in side elevation and partially in section; Fig. 12 is a view in side elevation, but with two of the wheels removed, showing a modified form of truck frame and spring arrangement; Fig. 13 is an end view thereof, partially in section, and Fig. 14 is a fragmentary plan view.

It will be understood that a truck is provided adjacent to each end of a car, and each truck supports a body bolster 6 in somewhat the usual manner.

The truck is provided with a pair of side frames 7 that support a truck bolster 8. The side frames each have vertically-spaced extensions 9 at both ends. Cross beams or end beams 10 are disposed between the extensions 9 of the side frames, and are of yoke-like form at their ends to receive pivot pins 11 for spindles 12. The spindles 12 have stub shaft or axle extensions 13 for the car wheels 14. Thrust bearings 15 are provided for the spindles 12 and suitable roller bearings 16 (Fig. 3) are provided for the wheels 14.

It will thus be seen that not only can each wheel rotate on its axle 13, but it can have swiveling or pivotal movement about its pivot pin 11.

The cross beams 10 are of I-beam or H form in cross-section, as shown more clearly in Fig. 2, and the flanges of the beams are provided with holes for the reception of guide pins 18, which are shouldered at their upper ends to support the side frames 7, and are also shouldered intermediate their ends to provide seats for cushioning springs 19. The lower ends of the springs rest upon the bottom flanges of the beams 10, so that the side frames 7, together with the truck bolster 8 are yieldably supported upon said cross beams. The guide pins further serve to hold the cross beams 10 against tilting or rocking about their longitudinal axes.

Side bearings 22 are positioned on the truck bolster 8 for engagement in the usual manner by the body bolster 6 when the car tilts and there is swivelling movement about the center pin 23.

Each of the spindles 12, at one end of the frame, has two pairs of arms or extensions 25 and 26 rigidly secured thereto, and the spindles at the other end of the truck have pairs of arms 27 and 28 rigidly connected thereto. The extensions 25 have pivotal connection with a link 30, and the arms 26 are similarly connected to a link 32. Therefore, when the flange of one of the wheels enters into thrust engagement with the side of a rail head, on a curve, the wheel and its spindle will be rocked about their vertical axis at 11, and such movement will be transmitted through connecting links 30 and 32 to the other wheel at that end of the truck frame. Similarly, the arms 27 are connected by a link 34 and the arms 28 connected by a link 35.

Movement of the wheels at one end of the truck frame about their vertical axes is transmitted to the wheels at the other end of the frame, through a lever 37 that is pivotally connected at 38 to a bracket extension 39a which is rigidly connected to an end beam 10. One end of the lever 37 is pivotally connected at 39 to the link 34 and the other end of the lever is pivotally connected at 41 to the link 32.

It will thus be seen that if the wheels at either end of the truck frame are rocked about their vertical axes, the lever 37 will be rocked about its fulcrum 38 to transmit pivotal movement in the opposite direction to the other pair of wheels. Thus, if the pair of wheels at one end of the truck are moved in a clockwise direction about their pivots 11, the wheels at the opposite end of the truck are rocked in a counter-clockwise direction about their vertical pivots. The result is that a leading wheel, when its flange engages the outer rail on a curve, will be shifted about its vertical axis, so that it will follow a path approximately coincident with the arc of the curve, and the wheel at the inner side of the curve will be similarly shifted. At the same time, the rear wheels will be so shifted that they too will follow the curve instead of being shifted laterally on the rail heads, as would be the case if they were rigidly connected to the truck frame. The flanges will remain at right angles to the radius of even sharp curves at all times.

As a result of shifting the truck wheels to an angular position relative to the longitudinal center of the truck frame, the car truck, in effect, rolls into and around the curve, with consequent lessening of friction and slippage between the wheels and the rails. In the usual truck construction where the wheels are rigidly maintained in parallelism with the longitudinal center of the truck frame, the trailing pair of wheels of the truck are slid across the rail heads as the leading pair of wheels enter the curve, since the entire truck is turned about the center pin. In effect then, the car wheels slide upon the rails during negotiation of the curve, since the wheels are not moved into coincidence with the arc of the curve.

Necessarily, the radius of the curve must be such as to accommodate the center-to-center distance or wheel base of a rigid wheel car truck, else excessive binding between wheel flanges and rail head would occur. In applicant's structure, such limitation of radius of curvature is not imposed, since the wheels are automatically turned on their vertical axes to positions approximately at right angles to the radii of the curve regardless of the wheel-base of the truck. The tracks, therefore, can be laid on curves of extremely short radius, if desired.

Furthermore, the connecting lever 37 serves to effect proper alignment of the truck wheels when they leave a curved section of the track and enter a straight section thereof, since if the lever were not employed, the wheels would have such idling movement about their vertical axis that the flange or certain of the wheels might continue to have great frictional engagement with the rails, after leaving a curve.

Such danger is reduced by reason of the fact that if the flange of a leading wheel continues to bear with great force against a rail, the flange of the diagonally opposite trailing wheel will similarly engage the opposite rail. The result is that the flange pressures on the two wheels will supplement one another to restore all of the wheels to straight-ahead position.

Various arrangements of brake-rigging may be employed, but in the case of short trucks, I prefer to further provide brake beams at the extreme ends of the trucks instead of between the wheels. Brake beams 43 and 44 are mounted on hangers 45 and 46, respectively, in a manner common in the art. These hangers are carried by extensions 47 and 48 that are carried by the side frames 7. A strut or link 50 is connected at one end to one of the beams 10, and at its other end has connection with a brake lever 51 that has pivotal connection with the strut 52 of the brake beam 43. A link 53 is connected to a lower end of the lever 51, and to a brake lever 54 which has connection with the beam 44 through a strut 55. The lever 54 has connection with a link 56 that is in turn connected to a lever 57 which is pivotally mounted on the other end beam 10.

A pull rod 58 is connected to the other end of the lever 57, and will be operated in any well-known manner to apply and release the brakes.

In Figs. 5 and 6, I show an arrangement whereby cushioning springs 60 which correspond to the springs 19 of Figs. 2 and 3 are set closer to the wheels, so as to reduce range of swaying movement of the car body, and therefore make for greater stability. Also, being positioned at the front and rear sides of each spindle, they effect better distribution of the weight and lessen twisting or tilting stresses on the spindles.

In this arrangement, the cross beams 61 correspond to the beams 10 of Figs. 1 and 2, which have pockets or boxes formed in their outer ends on the bottoms of which the springs 60 rest. The boxes carry pivot pins 62 which support spindles 63, as in the manner of the pins 11 and spindles 12 of Fig. 3, the wheels 64 being mounted on shaft-like extensions 65 of the spindles.

Side frames 66 have riveted thereto a truck bolster 67 which carries a center plate 68 for the usual body bolster, as in Figs. 1 and 4. The side frames are provided with sleeve portions 70 that rest upon spring seats 71. The sleeves 70 extend through openings in the upper sides of the spring boxes, and thus prevent shifting of the side frames relative to the cross beams 61.

The side frames 66 at their ends are provided with downwardly-extending portions 72, and at a mid point, with extensions 73. These extensions 72 and 73 cooperate with the adjacent faces of the cross-beam boxes to serve as guides which, while permitting vertical movement of the side frames relative to the cross beams 61, will also prevent tilting of the cross beams about their longitudinal axes.

The pairs of wheels are respectively connected by links 75 and 76 that have connections through arms 77 and 78, respectively, which are secured to the spindles 63. The wheels of each pair can swivel about their pivot pins 62, to follow the contour of curves, and motion of each wheel is transmitted through its link 75 or 76 as the case may be, to its associated wheel.

One distinction in this link and pivot arrangement of the truck of Fig. 5, as shown in Figs. 1 to 4, resides in the fact that in Fig. 5, the leading pair of wheels when first engaging the curve, will be swung about their pivots without disturbing the rear wheels, the rear wheels, of course, being swung about their pivots when they reach the curve.

Not only is the invention applicable to cars having a complete truck at each end, but it is applicable also to cars having only one pair of wheels at each end, as in Figs. 7, 8 and 9, since the wheels can be mounted for pivotal movement about vertical axes and connected through link mechanism as hereinbefore described. The use of the invention in the last-named manner would be particularly advantageous because of difficulty in enabling cars of the type referred to, to safely pass around curves. The car body is provided with a bottom plate or bolster 80, to which are secured a pair of depending U-shaped side frames 81. A cross beam 82 has box ends that contain springs 83. A pivot pin 84 is mounted in each box end of the cross beam and carries a spindle 85 which support a wheel 86.

The side frames 81 carry tubular extensions 88 that are supported on the springs 83, through the medium of spring-seating blocks 89. The extensions 88 project through the upper walls of the spring housings to prevent shifting of the beam 82 cross-wise of the car body. The down-turned ends 90 of the side frames 81 engage the vertical sides of the spring pockets to serve as guides and to prevent tilting of the cross beams 82.

The spindles 85 are connected by a link 92, so that pivotal movement of one wheel on its pin 84 will be transmitted to the other wheel. Means are provided for aligning the wheels in straight-ahead position, when they leave a curve, such means consisting of centering springs 93 disposed at opposite sides of a bracket 94 that is secured to the cross beam 82, and abutting against tensioning nuts 95 which are adjustably mounted on the link 92 and serve as adjustable spring seats.

Referring to Figs. 10 and 11, certain of the parts are of the same general arrangement as the parts shown in Figs. 5 and 6, in that spring boxes and cross beams 100 support spindles 101 that have axle-like extensions upon which the wheels turn. Each pair of spindles 101 is connected through their arm-like extensions 102, by a link 103.

An important feature of distinction in Figs. 10 and 11 over the structure of Figs. 5 and 6 resides in the provision of a truck frame member 104, of X-form, and which may consist entirely or mainly of a single forging or be cast. A center bearing plate 104a is formed on the mid portion of the frame 104, and the frame has an arm 105 extending to each wheel mounting.

Depending flanges 106 and 107 are provided on the end of each arm 105, and these arms embrace spring boxes or housings 108 that are carried by the ends of the cross beams 100, and serve as guides during vertical movement of the truck frame 104 relative to the wheels, and to support the spring boxes and the beams 100 against tilting movement. A brace bar 109 is welded or otherwise secured at its ends to the legs 107 of the truck frame 104, so as to stiffen and strengthen these parts of the frame. Web plates 109a can be welded to the downturned flanges of the frame 104 to further strengthen the same at various desired points.

The springs 110 are contained within the spring boxes 108, and the arms 105 of the truck frame are supported on these springs through the medium of guides 111 that extend through the upper sides of the spring boxes and rest upon spring seats 112. The guide members 111 may be cast or forged integrally with the frame 104 or welded to the arms 105.

From the foregoing, it will be seen that the frame member 104 not only serves as a truck bolster and constitutes the main portion of the truck frame, but gives the truck structure great rigidity against stresses which may be imposed thereon in various directions.

In Figs. 12, 13 and 14, the spindles and wheels are mounted in spindle housings 113 carried on the end of cross beams 114, and have link connections substantially as in Figs. 5 and 6. However, in this form of structure, pairs of leaf springs 115 and 116 serve not only as cushioning springs, but also as side frames. The springs are of the elongated type, and the longest leaf of the springs 115 are curled to form eyes at their ends and are connected by pins or bolts 117 that extend through flanges or wings 118 that are formed on the spindle housings 113. Similarly, the lowermost leaves of springs 116 have their ends curled for connection with bolts 119 that are carried by downwardly-extending portions of the housings 113. Each pair of springs are secured together by a sleeve 120 which is shrunk around the mid portion thereof.

A truck bolster 121 has a center bearing 122 at its mid portion, and at its ends has enlargements 123 and 124 that serve as spring seats. Bolts 125 and 126 are employed for securing the springs to the truck bolster.

From the foregoing, it will be seen that the truck is of greatly reduced weight, and that a fewer number of parts are required than in the case of standard types of railway trucks.

I claim as my invention:—

1. The combination with a truck having two pairs of wheels, of a cross beam disposed between the wheels of each pair, a spindle mounted on each end of the beams, for oscillation about a vertical axis, an axle carried by each spindle, for the adjacent wheel, a truck frame having portions extending to the sides of the truck, frame-supporting springs interposed between said portions and the said cross beams, the springs and the spindles at each side of the truck being disposed in a common vertical plane, and the springs being arranged in pairs, with one spring in front of and one behind each spindle, and guide members for holding the cross beams in cooperative relationship to the truck frame.

2. The combination with a truck having two pairs of wheels, of a cross beam disposed between the wheels of each pair and each having a housing formed on its ends, a spindle mounted in each housing for oscillation about a vertical axis, an axle carried by each spindle, for the adjacent wheel, a truck frame having portions extending into positions above said housings, frame-supporting springs interposed between said portions and the said housings, and guide members extending downwardly from the truck frame along the front and rear sides of the said housings.

3. The combination with a truck having two pairs of wheels, of a cross beam disposed between the wheels of each pair and each having a housing formed on its ends, a spindle mounted in each housing for oscillation about a vertical axis, an axle carried by each spindle, for the adjacent wheel, a truck frame having portions extending into positions above said housings, frame-supporting springs interposed between said portions and the said housings, and guide members extending downwardly from the truck frame along the front and rear sides of the said housings, the springs being arranged in pairs within each housing, with one spring in front of and one behind each spindle.

4. The combination with a truck having two pairs of wheels, of a cross beam disposed between the wheels of each pair, a spindle mounted on each end of the beam for oscillation about a vertical axis, an axle carried by each spindle, for the adjacent wheel, diagonally arranged truck frame members each extending from a point adjacent to the center of the truck to a point adjacent to one of the spindles, the said frame members having rigid relationship with one another, frame supporting springs interposed between said frame members and the cross beams at each side of the truck, the springs and the spindle at each side of the truck being disposed in a common vertical plane, and guide members for holding the cross beams in cooperative relationship to the truck frame.

W. S. DIETRICH.